(12) United States Patent
Kreutz et al.

(10) Patent No.: US 12,049,249 B2
(45) Date of Patent: Jul. 30, 2024

(54) STEERING COLUMN FOR A MOTOR VEHICLE

(71) Applicants: thyssenkrupp Presta AG, Eschen (LI); thyssenkrupp AG, Essen (DE)

(72) Inventors: Daniel Kreutz, Feldkirch (AT); Andreas Willi, Lauterach (AT)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 0 days.

(21) Appl. No.: 17/802,713

(22) PCT Filed: Nov. 4, 2020

(86) PCT No.: PCT/EP2020/000186
§ 371 (c)(1),
(2) Date: Aug. 26, 2022

(87) PCT Pub. No.: WO2021/170199
PCT Pub. Date: Sep. 2, 2021

(65) Prior Publication Data
US 2023/0119092 A1    Apr. 20, 2023

(30) Foreign Application Priority Data

Feb. 27, 2020    (DE) ...................... 10 2020 202 536.3

(51) Int. Cl.
*B62D 1/181*    (2006.01)
*B62D 1/187*    (2006.01)

(52) U.S. Cl.
CPC ............. *B62D 1/181* (2013.01); *B62D 1/187* (2013.01)

(58) Field of Classification Search
CPC ................................ B62D 1/181; B62D 1/187
See application file for complete search history.

(56) References Cited

U.S. PATENT DOCUMENTS

| 11,679,798 B2 * | 6/2023 | Kreutz ................... B62D 1/181 |
| | | 280/775 |
| 2004/0032121 A1 | 2/2004 | Schafer et al. |

(Continued)

FOREIGN PATENT DOCUMENTS

| DE | 10144476 A1 | 3/2003 |
| DE | 102004044472 A1 | 3/2006 |

(Continued)

OTHER PUBLICATIONS

English Translation of International Search Report issued in PCT/EP2020/000186, dated Mar. 17, 2021.

*Primary Examiner* — Faye M Fleming
(74) *Attorney, Agent, or Firm* — thyssenkrupp North America, LLC

(57) ABSTRACT

A steering column for a motor vehicle may include an actuating unit in which a steering spindle is rotatably mounted and which is held in an adjustable manner by a supporting unit, an adjustment device for adjusting the actuating unit with respect to the supporting unit, and a position-sensing device that includes a first sensor unit for sensing the position of the actuating unit with respect to the supporting unit. The position-sensing device may also include a second sensor unit for sensing a state when the actuating unit is in a predetermined position relative to the supporting unit. One or both of the sensor units may be configured to operate in a contactless manner.

13 Claims, 5 Drawing Sheets

(56) References Cited

U.S. PATENT DOCUMENTS

| | | | | |
|---|---|---|---|---|
| 2016/0375927 A1* | 12/2016 | Schulz | ............... | B60R 21/2338 |
| | | | | 280/775 |
| 2018/0086378 A1 | 3/2018 | Bell et al. | | |
| 2021/0291890 A1 | 9/2021 | Kreutz et al. | | |
| 2022/0258789 A1* | 8/2022 | Vitalis | .................... | B62D 1/181 |
| 2023/0182802 A1* | 6/2023 | Bayer | .................... | B62D 1/185 |
| | | | | 280/775 |

FOREIGN PATENT DOCUMENTS

| | | |
|---|---|---|
| DE | 10 2019 108 466 A1 | 2/2020 |
| DE | 102021205534 A1 * | 12/2022 |

\* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2020/000186, filed Nov. 4, 2020, which claims priority to German Patent Application No. DE 10 2020 202 536.3, filed Feb. 27, 2020, the entire contents of which are incorporated herein by reference.

FIELD

The present disclosure generally relates to steering columns, including stowing and unstowing steering columns for motor vehicles.

BACKGROUND

The adjustment of the actuating unit should be understood in the sense of moving or displacing the actuating unit. The adjustment of the actuating unit corresponds to the adjustment of the position of the steering spindle along the adjustment direction of the adjustment device. The actuating unit is held in an adjustable manner by the supporting unit. In other words: the actuating unit is arranged in an adjustable manner on the supporting unit.

Steering columns for motor vehicles have a steering spindle, on the rear end of which in the direction of travel, which faces the driver, a steering wheel is arranged for the purpose of introducing a steering command by the driver. This end is referred to as the steering-wheel-side end of the steering spindle. The steering spindle is mounted so as to be able to rotate about its longitudinal axis in a casing unit or in an actuating unit accommodated in the casing unit, wherein the casing unit is supported by a supporting unit which can be fitted to the vehicle body. As a result of the fact that the actuating unit is accommodated in a casing unit, which is connected to the supporting unit and is also referred to as a guide box or box section swing arm, in a telescopically displaceable manner in the direction of the longitudinal axis, it is possible to carry out a longitudinal adjustment. A height adjustment can be achieved by virtue of the fact that the actuating unit or a casing unit accommodating the latter is pivotably mounted on the supporting unit. The adjustment of the actuating unit in the longitudinal or height adjustment direction makes it possible to set an ergonomically optimum steering wheel position relative to the driver position in an operating position, also referred to as a driving or operator control position, in which there can be a manual steering intervention. The longitudinal and height adjustment is also important for optimizing the driver's view of the display/instrument panel or the dashboard of the vehicle.

The longitudinal and height adjustment of steering columns can be carried out using in each case at least one electrical servomotor. Such steering columns are referred to as electrically adjustable steering columns or EVLS.

Electrically adjustable steering columns are very important, in particular for future, highly automated motor vehicles which can be controlled or driven both manually by a human driver and autonomously by an intelligent driving system. In order to be able to manually control the vehicle, the steering column needs to be moved into a so-called unstowed state. In order to allow the vehicle to be controlled autonomously, the steering column can be moved into a so-called stowed state. In this respect, such electrically adjustable steering columns are also referred to as stowable and unstowable steering columns.

The unstowed state of a stowable and unstowable, electrically adjustable steering column corresponds to the situation of a conventional, electrically adjustable steering column. That is to say, the steering column is adjusted by means of the longitudinal and height adjustment in such a manner that the steering spindle, and therefore the steering wheel, is positioned inside the cockpit or the driver's cab or the passenger compartment for inputting steering commands.

In the stowed state of a stowable and unstowable, electrically adjustable steering column, the latter is adjusted by means of the longitudinal and height adjustment in such a manner that the steering spindle, and therefore the steering wheel, is positioned outside the cockpit or the driver's cab or the passenger compartment, in any case out of reach of the human driver and inside the dashboard or inside the engine compartment. Moving the steering column into the dashboard provides additional space for the driver in the cockpit or the driver's cab or the passenger compartment. As a result, the driver is able to attend to activities other than control or driving during the journey. The driver could therefore move his seat into a comfortable position for relaxing, into an upright position for reading, into a horizontal position for resting or sleeping. The driver could likewise direct his seat into the vehicle interior in order to face other vehicle occupants.

For reliable operation of stowable and unstowable, electrically adjustable steering columns, it is necessary to reliably sense the position or spatial location of the steering column in all of its adjustment directions.

A steering column with position sensing is known from US 2018/0086378 A1. Said document proposes an electrical generator having an input shaft and a steering spindle kinematically coupled to the input shaft, wherein the steering spindle is movable relative to the electrical generator. The electrical generator converts the kinetic energy caused by the movement of the steering spindle into electrical energy, which allows a conclusion to be drawn on the position of the steering spindle.

The disadvantage of such a steering column is the relatively complicated and thus maintenance-intensive structure. Since this involves a relative measurement method, that is to say the change in the steering spindle position is sensed and is then related to a predefined reference value, distorted measured values may also arise in certain situations.

Furthermore, the prior art discloses the practice of sensing the position of the steering spindle by means of a Hall sensor by counting so-called Hall counts, wherein a conclusion can be drawn on the change in the steering spindle position from the number of Hall counts. This involves a relative measurement method. The problem with this is that if Hall counts—for whatever reasons—are not counted, a position which is incorrect or differs from the real position such that it is no longer possible to determine the position with sufficient accuracy is sensed. Although the effect of failing to count a few individual Hall counts on the measurement accuracy may sometimes be negligible, there is the risk of the sensed steering spindle position drifting away from the actual steering spindle position, specifically the failures to count individual Hall counts being summed over the operating time.

Thus a need exists for a steering column having a position-sensing device, which has a simple and robust structure and the operation of which is reliable and safe.

DETAILED DESCRIPTION

Figure 1:
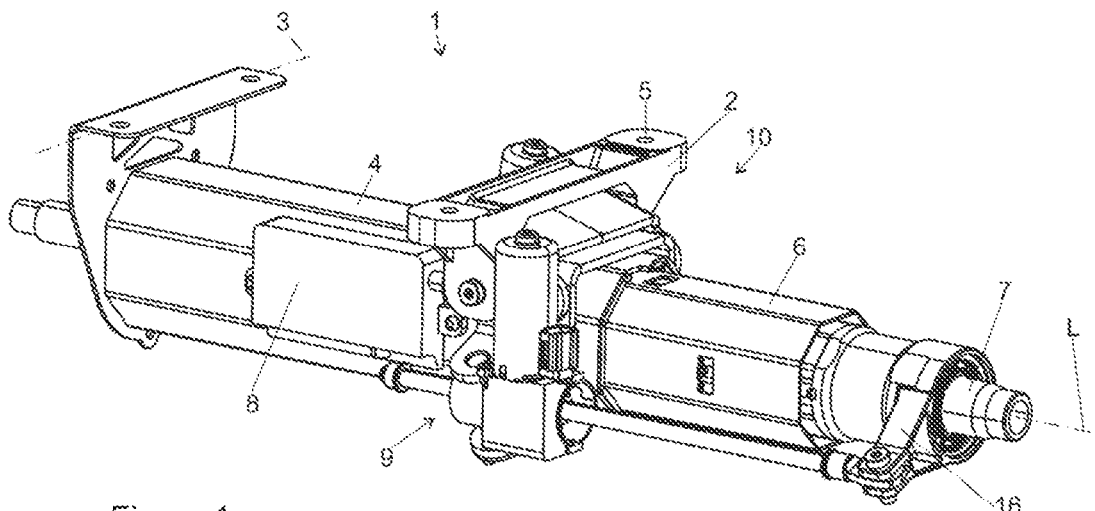
FIG. 1 is a perspective view of one embodiment of an example steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to steering columns for motor vehicles, in particular for stowing and unstowing steering columns. In some examples, a steering column may include an actuating unit in which a steering spindle is rotatably mounted and which is held in an adjustable manner by a supporting unit, an adjustment device for adjusting the actuating unit with respect to the supporting unit, and a position-sensing device which comprises a first sensor unit for sensing the position of the actuating unit with respect to the supporting unit. The present disclosure also generally relates to methods for adjusting steering columns and to methods for controlling subsystems of motor vehicles.

A steering column for a motor vehicle is proposed, comprising an actuating unit in which a steering spindle is rotatably mounted and which is held in an adjustable manner by a supporting unit, an adjustment device for adjusting the actuating unit with respect to the supporting unit, and a position-sensing device which comprises a first sensor unit for sensing the position of the actuating unit with respect to the supporting unit.

According to the invention, the position-sensing device comprises a second sensor unit for sensing a state when the actuating unit is in a predetermined position relative to the supporting unit. The predetermined position can be set or stored as a reference value. This may be carried out, for example, when mounting the second sensor unit on the steering column. The reference value can be determined, in particular, by means of a reference movement of the steering spindle to or into the adjustment position corresponding to the reference value for the purpose of collecting data before starting up the steering column as intended. In particular, the predetermined position is a position which differs from the positions defined by the end stops of the actuating unit.

The supporting unit can be fitted to a vehicle body. In addition, a casing unit may be fastened to the supporting unit so as to be pivotable about a pivot axis. The actuating unit may be accommodated in the casing unit.

The steering column may also comprise a control unit, also referred to as an "electrical control unit" or ECU, which controls the adjustment device.

The first sensor unit is used to sense, in particular in relative terms, the position of the actuating unit with respect to the supporting unit and therefore to sense, in particular in relative terms, the position of the steering spindle with respect to the supporting unit. The first sensor unit may be configured to generate a first sensor signal, for example on the basis of Hall counts, and to transmit it to the control unit.

The control unit may be designed to receive an (input) signal or a plurality of (input) signals, in particular the first sensor signal, to evaluate said signal(s) and to then perform definable actions, in particular to generate an (output) signal or a plurality of (output) signals and to transmit said signal(s) to the adjustment device.

The second sensor unit is used to sense, in particular in absolute terms, the predetermined position of the actuating unit with respect to the supporting unit and therefore to sense, in particular in absolute terms, the predetermined position of the steering spindle with respect to the supporting unit. The second sensor unit is advantageously designed in such a manner that the predetermined position can be defined at any desired position over the entire adjustment travel of the actuating unit with respect to the supporting unit. In particular, a plurality of positions or a position portion can also be defined as the predetermined position. The predetermined position is advantageously in an area around a central adjustment position of the actuating unit with respect to the supporting unit. In particular, the predetermined position is defined in such a manner that a transition from the stowed area to the operator control area and vice versa can be reliably detected.

The second sensor unit may comprise a transmitter or transducer module and a receiver module, wherein the transmitter module and the receiver module are movable relative to one another. The second sensor unit may be configured to generate a second sensor signal, for example a signal with a binary value, a discrete value, a quasi-continuous value or a continuous value, and to transmit it to a control unit. A second sensor signal with a binary value may represent the presence and absence of the transmitter module with respect to the receiver module, or vice versa. A second sensor signal with a binary value has a step or a pulse as soon as the relative distance between the transmitter module and the receiver module reaches or falls below or exceeds a stipulated threshold value. A second sensor signal with a discrete value, a quasi-continuous value or a continuous value may represent the distance between the transmitter module and the receiver module. The second sensor signal is also referred to as a revision signal. This signal is then output to the control unit or sensed by the latter when the actuating unit is in the predetermined position.

In the sense of the invention, the term "transmitter module" is not restricted to this module emitting a signal. For example, the transmitter module may be in the form of a permanent magnet or a metal body.

The predetermined position may be understood as meaning an individual position or a range of positions.

Suitably positioning the transmitter module with respect to the receiver module, which may vary from vehicle to vehicle on account of design differences, generates a stimulus in the form of a step or a pulse in the second sensor signal in the case of at least one particular adjustment position, in particular during each process of stowing and unstowing the steering column. The stimulus in the second sensor signal can be used as an indicator or a triggering event.

During the adjustment of the actuating unit and of the steering spindle mounted therein, the transmitter module and the receiver module move relative to one another. The transmitter module and the receiver module are positioned with respect to one another, that is to say are each arranged on the steering column, in such a manner that the modules are directly opposite one another at least in a particular adjustment position which differs, in particular, from the end positions. In precisely this adjustment position, the relative distance between the transmitter module and the receiver module reaches or falls below or exceeds—depending on the stored query or logic—a previously stipulated threshold value, thus generating a stimulus in the second sensor signal. The threshold value is stipulated before start-up and can be registrable as a changeable setting, for example of the control unit, or can be registered as an unchangeable or hard-coded setting, for example of the control unit.

The position-sensing device of the steering column according to the invention makes it possible to effectively avoid collisions between the steering column or its parts and lining elements inside the cockpit. This is because potential or imminent collisions can be detected in good time and can be averted by initiating countermeasures.

For vehicle safety, it is important to detect "unauthorized" or potentially dangerous vehicle states in good time. The position-sensing device of the steering column according to the invention is also used to detect unintentional stowing during the manual drive. It is also important that the correct airbag system is triggered in the event of an accident or crash. On account of its ability to distinguish states of the steering column from one another, the position-sensing device of the steering column according to the invention is therefore able to trigger the correct airbag system in order to optimally protect the driver. For example, an airbag in the steering wheel can be fired in the event of a crash in an unstowed state in which the driver himself is driving the vehicle, and the airbag in the steering wheel can remain unfired and an airbag in the instrument panel can be fired in the event of a crash in a stowed state in which the vehicle is controlled autonomously.

The first sensor unit may be integrated in the adjustment device or arranged outside the adjustment device. The first sensor unit may be designed in such a manner that it continuously senses the adjustment, that is to say during the entire operating time of the steering column or at least during the entire adjustment period.

The control unit may be integrated in the casing unit or arranged outside the casing unit.

The control unit may be designed to correct the sensor values from the first sensor unit on the basis of the second sensor signal. Specifically, the sensor values from the first sensor unit may be subjected to a comparison with a validation value as soon as the spatial condition resulting in a stimulus being generated in the second sensor signal is met. The validation value may be a sensor value from the second sensor unit operating in absolute terms, which is sensed when the spatial condition is met, or a predefined reference value.

The control unit may also be designed to control, in particular activate and deactivate, different subsystems of the motor vehicle on the basis of the second sensor signal. This makes it possible to distinguish states of the steering column and circuit logic can be defined, according to which certain subsystems of the vehicle are activated or deactivated only when a particular spatial condition is met.

For example, different airbag systems can be activated or deactivated in this manner. If the steering column is in one of the possible unstowed states in order to make it possible for the driver to manually control the motor vehicle, the airbag system in the steering wheel should necessarily be activated and the airbag system in the dashboard arranged behind the steering wheel, from the driver's point of view, should be deactivated in order to optimally protect the driver.

If, in contrast, the steering column is in one of the possible stowed states in order to provide the driver with additional space in the driver's cab or passenger compartment for his free disposal during the autonomous journey of the motor vehicle, the airbag system in the dashboard should be necessarily activated and the airbag system in the stowed steering wheel should be deactivated in order to optimally protect the driver.

One advantageous configuration results from the first sensor unit and/or the second sensor unit being designed to operate in a contactless manner, in particular magnetically, inductively, optically or the like. In other words: the sensor units are designed to operate in a contactless manner. This reduces the mechanical wear on the sensor unit and therefore improves its durability or longevity. Sensor units designed to operate magnetically or inductively are particularly preferred since they are not very susceptible to faults and are distinguished by a simple and robust structure.

It is also advantageous if the sensor units are each designed to use the same measurement principles. This reduces the complexity of the steering column with respect to manufacturing, maintenance and structure. Alternatively, however, the sensor units may also be designed to use different measurement principles. This makes it possible to increase reliability and complete failure of the position-sensing device can be largely reduced.

Furthermore, the position-sensing device may comprise a third sensor unit for sensing a second state when the actuating unit is in a predetermined second position relative to the supporting unit. The second position is a different position than the position of the second sensor unit. In other words: the second position is a position differing from the position of the second sensor unit. The predetermined second position can be set or stored as a reference value. The reference value can be determined, in particular, by means of a reference movement of the steering spindle to or into the second adjustment position corresponding to the reference value for the purpose of collecting data before the steering column is started up as intended. This may be carried out, for example, when mounting the steering column or when mounting the steering column in the motor vehicle.

In a similar manner to the second sensor unit, the following applies: the third sensor unit is used to sense, in particular in absolute terms, the position of the actuating unit with respect to the supporting unit and therefore to sense, in particular in absolute terms, the position of the steering spindle with respect to the supporting unit. The third sensor unit may comprise a transmitter or transducer module and a receiver module, wherein the transmitter module and the receiver module are movable relative to one another. The third sensor unit may be configured to generate a third sensor signal, for example a signal with a binary value, discrete value, a quasi-continuous value or a continuous value, and to transmit it to a control unit. A third sensor signal with a binary value may represent the presence and absence of the transmitter module with respect to the receiver module, or vice versa. A third sensor signal with a binary value has a step or a pulse as soon as the relative distance between the transmitter module and the receiver module reaches or falls below or exceeds a stipulated threshold value. A third sensor signal with a discrete value, a quasi-continuous value or a continuous value may represent the distance between the transmitter module and the receiver module. The third sensor signal is also referred to as a second revision signal or merely as a revision signal.

In one advantageous development, the receiver module may be in the form of an inductive sensor. Alternatively, the receiver module may also be in the form of a magnetic switch.

The terms "transmitter module" and "transducer module" can be used as alternatives to one another. The transmitter module or the transducer module may be in the form of an active or passive transmitter module. The passive transmitter module may be in the form of a permanent magnet or a ferromagnetic element, for example.

Furthermore, the adjustment device may be a longitudinal adjustment device and/or a height adjustment device. In other words: the actuating unit may be adjustable with respect to the supporting unit in a longitudinal adjustment direction and/or a height adjustment direction. A longitudinal and height adjustment of the actuating unit and of the steering spindle mounted therein is suitable for ergonomically adapting the steering wheel position relative to the driver.

The receiver module of the second sensor unit and/or of the third sensor unit may be stationary with respect to the adjustment direction of the position-sensing device and the transmitter module may be movable relative to the receiver module. The transmitter module may therefore be moved past the receiver module. Alternatively, the transmitter or transducer module of the second sensor unit and/or of the third sensor unit may be stationary with respect to the adjustment direction of the position-sensing device and the receiver module may be movable relative to the transmitter module. The receiver module can therefore be moved past the transmitter module. In both alternatives, one module is stationary with respect to the adjustment direction in question, whereas the other module is movable or can be displaced along this adjustment direction. In other words, during an adjustment in the corresponding adjustment direction, a relative displacement of the transmitter module with respect to the receiver module takes place.

Furthermore, the transmitter module and the receiver module can be advantageously positioned with respect to one another in such a manner that the relative distance between the transmitter module and the receiver module reaches or falls below or exceeds the stipulated threshold value during each stowage and unstowage or during each stowing and unstowing operation.

In a further advantageous manner, the transmitter module and the receiver module may be positioned with respect to one another in such a manner that the relative distance between the transmitter module and the receiver module is as small or short as possible. It is thus possible to generate a particularly good quality of the revision signal. The distance between the transmitter module and the receiver module in the predetermined position is particularly preferably minimal. In other words, the distance between the transmitter module and the receiver module in the predetermined position is shorter than in any other position which can be assumed by the actuating unit with respect to the supporting unit.

In a manner according to the invention, a method for adjusting the steering column according to the invention is also proposed. The method comprises the steps of adjusting the actuating unit, in particular the position of the actuating unit, in particular the position of the steering spindle, with respect to the supporting unit by means of the adjustment device, with the result that the steering spindle of the steering column is adjusted along the corresponding adjustment direction; sensing the position of the actuating unit by means of the first sensor unit, in particular by means of a relative measurement method; sensing a state by means of the second sensor unit when the actuating unit is in a predetermined position relative to the supporting unit.

In an advantageous manner, the method has the following further steps: comparing the position sensed by the first sensor unit with the predetermined position of the actuating unit if the second sensor unit senses the state; detecting a malfunction of one of the sensor units if the discrepancy determined by the comparison exceeds a stipulated threshold value. The threshold value may be stipulated before start-up and may be registrable as a changeable setting of the control unit or may be registered as an unchangeable or hard-coded setting of the control unit.

The detection makes it possible to avoid an incorrect sensor value, that is to say an incorrect position which remains undetected as such, being sensed in the sense of a "false positive". This may be the case, in particular, for systematic faults or drift errors over the operating time of the steering column. The respective position of the steering spindle can therefore be reliably sensed both in the longitudinal adjustment direction and in the height adjustment direction.

In a further advantageous manner, the method has the following further steps: sensing a second state by means of a third sensor unit when the actuating unit is in the predetermined second position relative to the supporting unit; comparing the position sensed by the first sensor unit with the predetermined second position of the actuating unit if the third sensor unit captures the second state; detecting a malfunction of one of the sensor units if the discrepancy determined by the comparison exceeds a stipulated threshold value. The third sensor unit makes it possible to check the result from the second sensor unit. This provides a type of redundancy which results in malfunctions of the sensor units being detected more reliably. This could be important in product development according to the ASIL-D classification.

The method preferably has the following further step: correcting the position of the first sensor unit if the malfunction is detected. For this purpose, the sensor value from the first sensor unit is preferably replaced with the sensor value from the second sensor unit, that is to say with the corresponding previously known position. The previously known position is a reference value which can be determined by means of a reference movement of the steering spindle to or into the adjustment position corresponding to the reference value for the purpose of collecting data before the steering column is started up as intended. Alternatively, the reference value may also be a position of the actuating unit measured by the second sensor unit. Incorrect sensor values or positions are therefore overwritten. The correction of the sensor values from the first sensor unit which differ from the true sensor or measured value therefore contributes to improving the reliability of the steering column.

In a further preferred manner, the method has the following further step: slowing down or stopping the adjustment or the adjustment movement of the actuating unit with respect to the supporting unit. This can be carried out, for example, when a discrepancy between the position determined by means of the first sensor unit and the position determined by means of the second sensor unit has exceeded a predetermined maximum discrepancy between the positions. The two positions determined by the sensor units are therefore compared. If these positions differ too greatly from one another, the adjustment is slowed down or stopped. In other words, the adjustment is slowed down and/or stopped when the actuating unit is in the predetermined position and the position determined by the first sensor unit differs from this predetermined position in such a manner that the positions determined by the two sensor units exceed a predetermined maximum discrepancy with respect to one another. The maximum permissible discrepancy is particularly preferably greater than 0.5 mm, very particularly preferably greater than 1 mm.

The comparison method step advantageously comprises the steps of capturing a sensor value by means of the second sensor unit or third sensor unit using an absolute measurement method; determining the discrepancy between the current sensor value from the first sensor unit and the sensor value from the second sensor unit or third sensor unit. This provides redundancy which further increases the reliability of the steering column.

Alternatively, the comparison method step comprises the steps of determining the discrepancy between the current sensor value from the first sensor unit and a stipulated reference sensor value from the second sensor unit or third sensor unit; storing the reference value as the sensor value from the second sensor unit or third sensor unit. The reference value can be determined by means of a reference movement of the steering spindle to or into the adjustment position corresponding to the reference value for the purpose of collecting data before the steering column is started up as intended. This makes it unnecessary to explicitly capture a sensor value by means of the second sensor unit, thus further simplifying the structure.

Furthermore, in a manner according to the invention, a method for controlling, in particular activating and deactivating, subsystems of a motor vehicle, in particular airbag systems, having the steering column according to the invention is proposed. The method comprises the steps of adjusting the actuating unit, in particular the position of the steering spindle of the steering column, with respect to the supporting unit by means of the adjustment device; generating a state signal of the steering column on the basis of the adjustment of the actuating unit, in particular the position of the steering spindle, during adjustment, wherein the revision signal is a changeover, step or pulse signal; detecting a first state of the steering column if the state signal assumes or falls below or exceeds a first value, or detecting at least one further state of the steering column if the state signal assumes or falls below or exceeds at least one further value. Alternatively, this step may be distinguished by detecting a first state of the steering column before the state signal has a pulse, or detecting at least one further state after the state signal has at least one pulse; controlling the subsystem corresponding to the detected state according to a stipulation.

The stipulation corresponds to an allocation, from which it is possible to derive which subsystem should be controlled in which detected state. The stipulation is defined before start-up and can be registrable as a changeable setting of the control unit or can be registered as an unchangeable or hard-coded setting of the control unit.

The driver can therefore be optimally protected by the selected airbag systems both in an unstowed state and in a stowed state. The choice, that is to say the deliberate activation and deactivation, of individual airbag systems from a multiplicity of different airbag systems arranged or installed in the vehicle structure surrounding the passenger compartment is dependent on the respective steering column state, that is to say dependent on whether the steering spindle is stowed or unstowed.

In the various figures, identical parts are always provided with the same reference signs and are therefore generally each named or mentioned only once.

FIG. 1 shows a perspective illustration, obliquely from the rear in the direction of travel of the vehicle, of one embodiment of the steering column 1 according to the invention.

The steering column 1 comprises a supporting unit 2 and a casing unit 4 fastened thereto so as to be pivotable about a pivot axis 3. The steering column 1 can be fitted to a vehicle body not illustrated in the figures via the supporting unit 2. For this purpose, the supporting unit 2 in the form of a two-part bracket has through-openings 5 for receiving fastening means which are likewise not illustrated in the figures. The supporting unit 2 is used to pivotably suspend the casing unit 4 on the vehicle body.

An actuating unit 6 is accommodated in the casing unit 4. The actuating unit 6 is movably connected to the casing unit 4, that is to say the actuating unit 6 is telescopically displaceable with respect to the casing unit 4 by virtue of the actuating unit being able to be pushed into the casing unit 4 and pulled out of the casing unit 4. The actuating unit 6 is in the form of a tubular body. The tubular body of the actuating unit 6 is coaxially arranged in the casing unit 4 at the end facing away from the driver, specifically is mounted in an axially displaceable manner therein.

The actuating unit 6 comprises a steering spindle 7. The steering spindle 7 is rotatably mounted in the actuating unit 6. The steering spindle 7 is therefore also rotatably mounted in the casing unit 4 since the actuating unit 6 is accommodated in the casing unit 4. The steering spindle 7 is therefore mounted in the casing unit 4 with the interposition of the actuating unit 6.

It is likewise conceivable and possible for the steering spindle 7 to be directly mounted in the casing unit 4. That end of the steering spindle 7 which faces the driver (FIG. 1, on the right-hand side) and is referred to as the steering-wheel-side end has external toothing which is not illustrated in the figures and is intended to receive a hub of a steering wheel, which hub has internal toothing and is likewise not illustrated in the figures. As an alternative to the external toothing and internal toothing, other positively locking profiles can also be used in order to couple the steering spindle 7 to the steering wheel in a torque-transmitting manner.

The steering column 1 also comprises a control unit 8 for evaluating a revision signal. The control unit 8 is firmly screwed to the casing unit 4.

The steering column 1 also comprises an adjustment device 9 which is in the form of a longitudinal adjustment device and is intended for the longitudinal adjustment of the steering spindle 7, specifically for the translational movement of the actuating unit 6 and therefore of the steering spindle 7 along the adjustment direction of the adjustment device 9, specifically along the steering spindle axis L, relative to the supporting unit 2 and relative to the casing unit 4. In other words: from the driver's point of view, this is an adjustment of the steering wheel position in the "forward and backward" direction.

The steering column 1 also has an adjustment device 10 which is in the form of a height adjustment device and is intended for the height adjustment of the steering spindle 7, specifically for pivoting the casing unit 4 together with the actuating unit 6 and therefore the steering spindle 7 along the adjustment direction of the adjustment device 10, specifically about the pivot axis 3, relative to the supporting unit 2. From the driver's point of view, this is an adjustment of the steering wheel position in the "up and down" direction.

Figure 2:
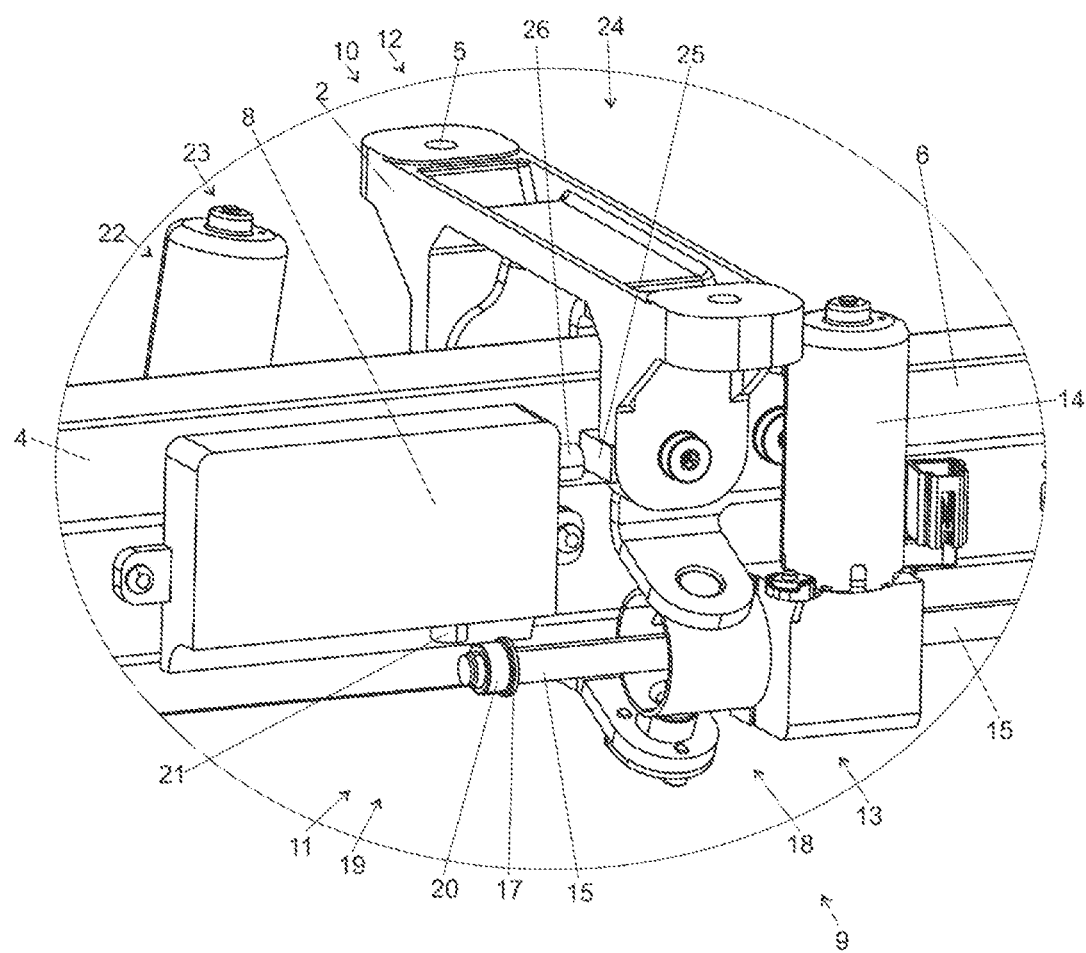
FIG. 2 a detailed perspective view of the steering column from FIG. 1.

FIG. 2 shows a perspective detailed illustration, obliquely from the front in the direction of travel of the vehicle, of the steering column 1 from FIG. 1.

The steering column 1 also comprises a position-sensing device 11 and a position-sensing device 12. The position-sensing device 11 is assigned to the adjustment device 9 in the form of a longitudinal adjustment device and is used to sense the position of the steering spindle 7 along the adjustment direction of the adjustment device 9, specifically along the longitudinal direction of the steering column 1. The position-sensing device 12 is assigned to the adjustment device 10 in the form of a height adjustment device and is used to sense the position of the steering spindle 7 along the adjustment direction of the adjustment device 10, specifically along the height direction of the steering column 1.

The adjustment device 9 in the form of a longitudinal adjustment device has an adjustment drive 13. The adjustment drive 13 comprises an electrical servomotor or electric motor 14, a spindle nut with an internal thread and a threaded spindle 15 with an external thread, wherein the spindle nut and the threaded spindle 15 are in threaded engagement with one another. The adjustment drive 13 rotationally drives the spindle nut about its axis of rotation. As a result of the threaded engagement of the spindle nut and the threaded spindle 15, the rotation of the spindle nut causes translation of the threaded spindle 15 along its longitudinal axis. The threaded spindle 15 is therefore a plunger spindle. The longitudinal axis of the threaded spindle 15 runs parallel to the steering spindle axis L. At its end facing the driver, the threaded spindle 15 is connected to the actuating unit 6 via an articulation lever 16 (FIG. 1), with the result that translation of the threaded spindle 15 causes translation or axial displacement of the actuating unit 6 along the steering spindle axis L.

An end stop 17 is arranged at that end of the threaded spindle 15 which faces away from the driver. The end stop 17 is used as a mechanical stop or (end) stop for the movement of the threaded spindle 15 along its longitudinal axis.

The position-sensing device 11 comprises a first sensor unit 18 and a second sensor unit 19.

The first sensor unit 18 is integrated in the adjustment drive 13. The translational movement of the threaded spindle 15 along its longitudinal axis corresponds, on account of the kinematic connection achieved via the articulation lever 16, to the translational movement of the steering spindle 7 along the steering spindle axis L. The first sensor unit 18 senses the longitudinal adjustment of the steering spindle 7 by means of a relative or incremental measurement method. This means that the first sensor unit 18 senses the change in a measurement variable, specifically the change in length or the change in the longitudinal adjustment of the steering spindle 7. The sensed change in the measurement variable is then related to a known reference value in order to determine the sensor value. The sensor value from the first sensor unit 18 corresponds to this reference value, while accordingly taking into account the sensed change in the measurement variable. The first sensor unit 18 senses the longitudinal adjustment of the steering spindle 7 continuously, that is to say during the entire operating time of the steering column or at least during the entire adjustment period.

The second sensor unit 19 senses the longitudinal adjustment of the steering spindle 7 by means of an absolute measurement method. That is to say, the second sensor unit 19 senses a measurement variable as such, specifically the position or range of positions or the length or longitudinal adjustment of the steering spindle 7. A reference to a reference value is not necessary and does not take place. Rather, the sensor value from the second sensor unit 19 corresponds directly to the sensed measurement variable. The position of the steering spindle 7 sensed by the second sensor unit 19 may advantageously be arbitrarily over the entire adjustment range of the steering spindle 7. In particular, the position of the steering spindle is sensed where there is a transition from the stowed area to the operator control area or a transition from the operator control area to the stowed area. This improves the control and triggering of that airbag with the best possible protective effect for a driver.

The second sensor unit 19 has a transmitter/transducer module 20 and a receiver module 21. The transmitter module 20 and the receiver module 21 are movable relative to one another. The receiver module 21 is connected to the control unit 8 in a stationary manner with respect to the adjustment direction of the position-sensing device 11, whereas the transmitter module 20 is connected to that end of the threaded spindle 15 which faces away from the driver. The transmitter module 20 is movable relative to the stationary receiver module 21 since the threaded spindle 15 can be axially displaced along its longitudinal axis by the adjustment drive 13.

The second sensor unit 19 senses the longitudinal adjustment of the steering spindle 7 precisely when the spatial distance between the transmitter module 20 and the receiver module 21 falls below the stipulated threshold value. The second sensor unit 19 therefore senses the longitudinal adjustment of the steering spindle 7 as soon as the steering spindle 7 either assumes or passes through the center position.

The adjustment device 10 in the form of a height adjustment device has an adjustment drive 22. The adjustment drive 22 causes the casing unit 4 to pivot about the pivot axis 3 (FIG. 1) and therefore causes the height adjustment of the steering column 1.

In a similar manner to the position-sensing device 11, the position-sensing device 12 comprises a first sensor unit 23 and a second sensor unit 24.

The first sensor unit 23 is integrated in the adjustment drive 22. It senses the height adjustment of the steering spindle 7 by means of a relative or incremental measurement method. The first sensor unit 23 senses the height adjustment of the steering spindle 7 continuously, that is to say during the entire operating time. With respect to the first sensor unit 23 and its relative measurement method and its continuous sensing, the statements made above with respect to the first sensor unit 18 sensing the longitudinal adjustment similarly apply.

The second sensor unit 24 senses the height adjustment of the steering spindle 7 by means of an absolute measurement method. The second sensor unit 24 has a transmitter/transducer module 25 and a receiver module 26. The transmitter module 25 and the receiver module 26 are movable relative to one another. The transmitter module 25 is connected to the supporting unit 2 in a stationary manner with respect to the adjustment direction of the position-sensing device 12. The receiver module 26 is movable relative to the stationary transmitter module 25 since the receiver module 26 is permanently connected to the control unit 8 and the control unit 8 is permanently connected to the casing unit 4, wherein the casing unit 4 can be pivoted about the pivot axis 3 relative to the supporting unit 2 by the adjustment device 10.

The transmitter module 25 and the receiver module 26 of the second sensor unit 24 of the adjustment device 10 are arranged with respect to one another in such a manner that, if the steering spindle 7 is in or passes through its center position—position between a minimum adjustment position and a maximum adjustment position—with respect to the height adjustment, the modules 25, 26 are directly opposite one another. In this adjustment position of the steering spindle 7, the spatial distance, that is to say the relative distance, between the transmitter module 25 and the receiver module 26 falls below a previously stipulated or predefined threshold value. At this point too, it should again be pointed out that the transmitter module 25 is not restricted to actively emitting a signal. This transmitter module 25 may be formed, for example, by a permanent magnet or from a ferromagnetic element. For example, it is also conceivable and possible for the transmitter module 25 and the supporting unit 2 to be formed as a one-piece integral component.

The second sensor unit 24 senses the height adjustment of the steering spindle 7 precisely when the spatial distance between the transmitter module 25 and the receiver module 26 falls below the stipulated threshold value. The second sensor unit 24 therefore senses the height adjustment of the steering spindle 7 as soon as the steering spindle 7 either assumes or passes through the center position. The center position therefore corresponds to a predetermined position between the minimum adjustment position and the maximum adjustment position.

With respect to the second sensor unit 24 and its absolute measurement method and its conditional sensing, the statements made above with respect to the second sensor unit 19 sensing the longitudinal adjustment similarly apply.

The control unit 8 is designed to correct the sensor values from the first sensor unit 18, 23 on the basis of the revision signal. It is also designed to activate and deactivate various airbag systems of the motor vehicle on the basis of the revision signal depending on the situation.

The first sensor unit 18 of the position-sensing device 11, the second sensor unit 19 of the position-sensing device 11, the first sensor unit 23 of the position-sensing device 12 and the second sensor unit 24 of the position-sensing device 12 are each in the form of magnetic sensors.

Figure 3:
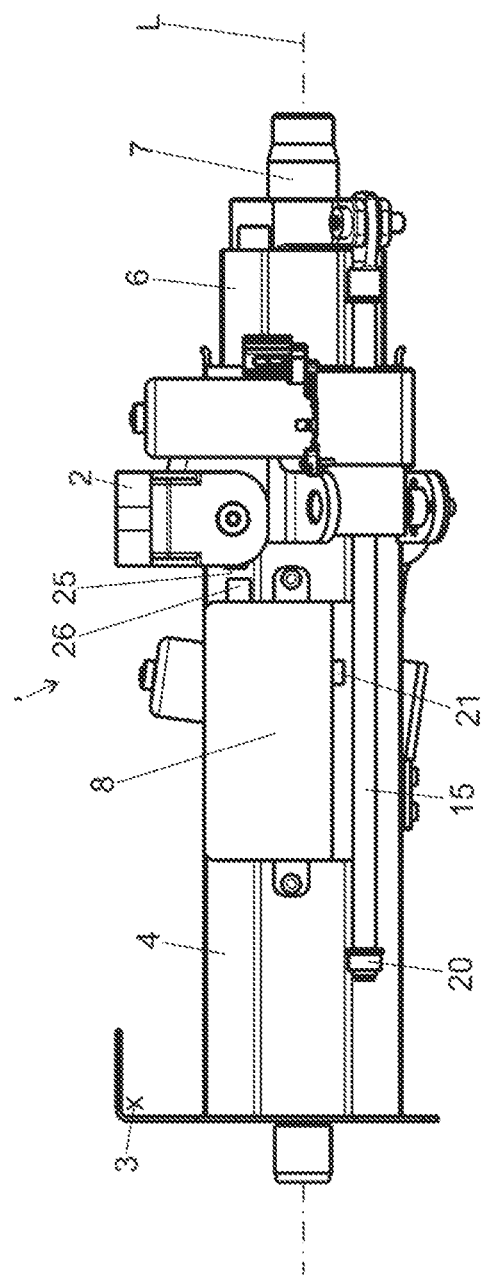
FIG. 3 is a side view of the steering column from FIG. 1.

FIG. 3 shows a side view of the steering column 1 from FIG. 1. The steering spindle 7 is fully retracted with respect to the longitudinal adjustment. In this state, the length of the steering column 1—measured from that end of the steering column 1 which faces the driver to that end of the steering column 1 which faces away from the driver along the steering spindle axis L—is reduced to its minimum. This state could correspond to a stowed state of the steering column 1, in which the steering column 1 is "stowed", that is to say moved or telescoped in, in the direction of the dashboard from the driver's point of view.

While the steering column 1 is in its stowed state, the motor vehicle could be controlled autonomously. In the stowed state of the steering column 1, the driver would have additional space in the driver's car or passenger compartment for his free disposal. The additional space obtained by stowing the steering column 1 could be used, for example, to move the driver's seat into a horizontal position in order to make it possible for the driver to rest during the autonomous journey of the motor vehicle.

With respect to the height adjustment, the steering spindle 7 is in its center position. That is to say, the steering spindle 7, and therefore the steering column 1, is in the central position between a highest adjustment position and a lowest adjustment position in its height adjustment direction. In the center position in the height adjustment direction, the transmitter module 25 and the receiver module 26 are directly opposite one another, that is to say are at the same height.

Figure 4:
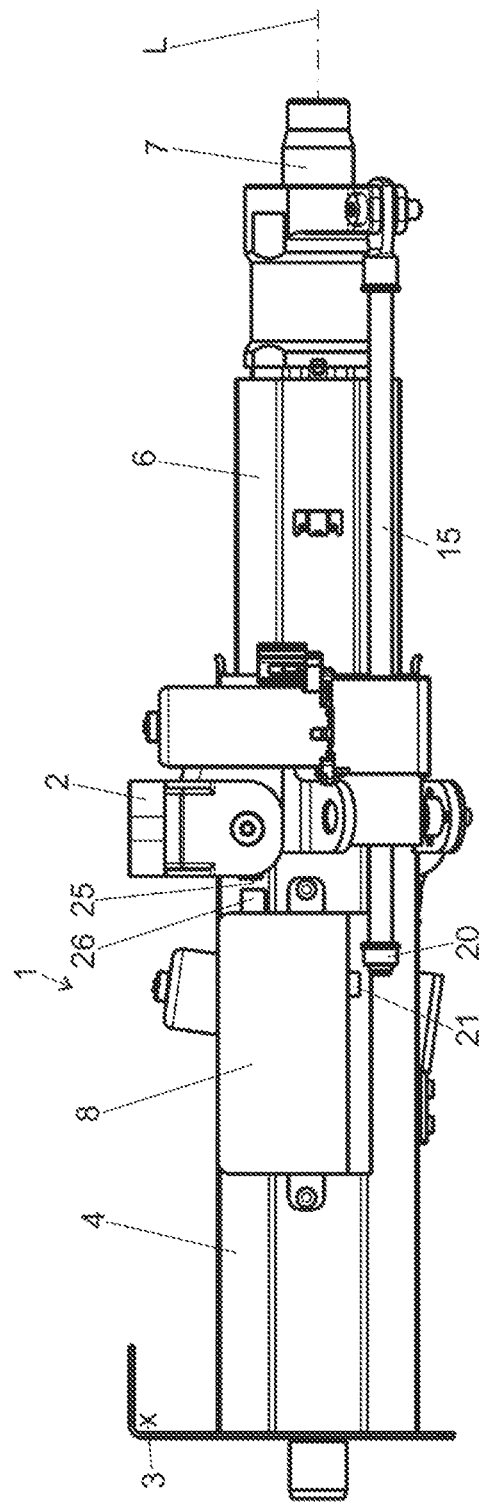
FIG. 4 is another side view of the steering column from FIG. 1.

FIG. 4 shows a side view of the steering column 1 from FIG. 1. In comparison with the adjustment position illustrated in FIG. 3, the steering spindle 7 is in an adjustment position slightly extended from the center position in the direction of the longitudinal adjustment. This state could correspond to a possible "unstowed state" of the steering column 1, in which the steering column 1 is "unstowed", that is to say moved or telescoped out, from the driver's point of view. Like in FIG. 3, the steering spindle 7 is in its center position with respect to the height adjustment.

Figure 5:
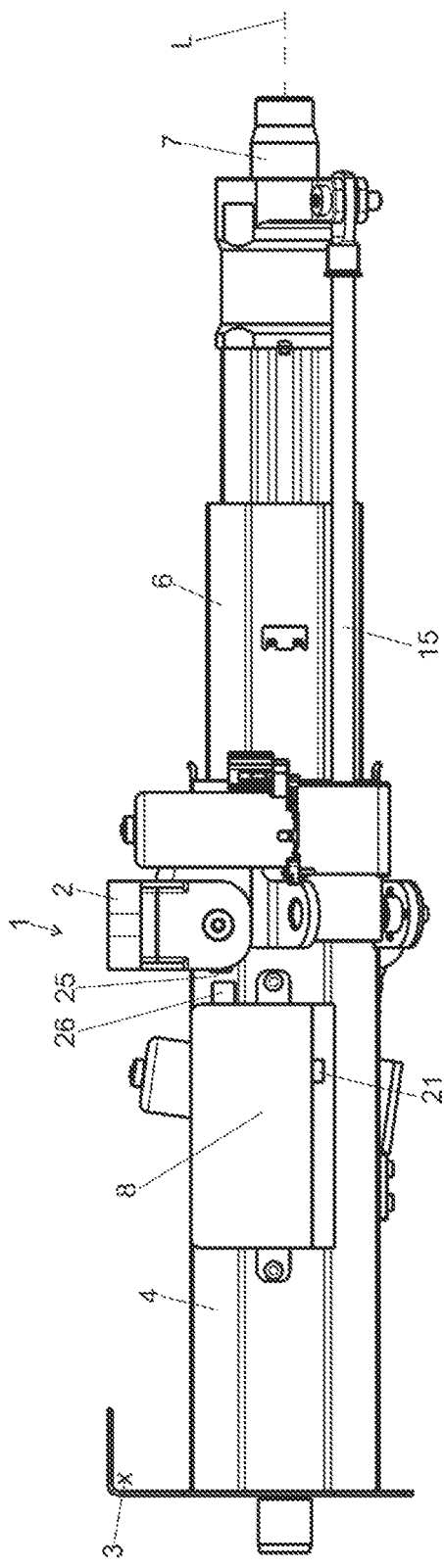
FIG. 5 is still another further side view of the steering column from FIG. 1.

FIG. 5 shows a side view of the steering column 1 from FIG. 1. The steering spindle 7 is fully extended with respect to the longitudinal adjustment. That end of the threaded spindle 15 which faces away from the driver and therefore the transmitter module 20 of the second sensor unit 19 of the position-sensing device 11 are not visible in this view. The end stop arranged at that end of the threaded spindle 15 which faces away from the driver butts against a mating surface of the adjustment drive 13 or is at least just before such surface contact. In this state, the length of the steering column 1 is increased to its maximum. This state could correspond to the greatest possible unstowed state of the steering column 1 and is also referred to as a fully extended state.

In an unstowed state of the steering column 1, the driver can comfortably input steering commands for the motor vehicle by rotating the steering wheel. While the steering column 1 is in one of its unstowed states, the motor vehicle could therefore be manually controlled by the driver. Like in FIG. 3, the steering column 1 is in its center position with respect to the height adjustment.

Figure 6:
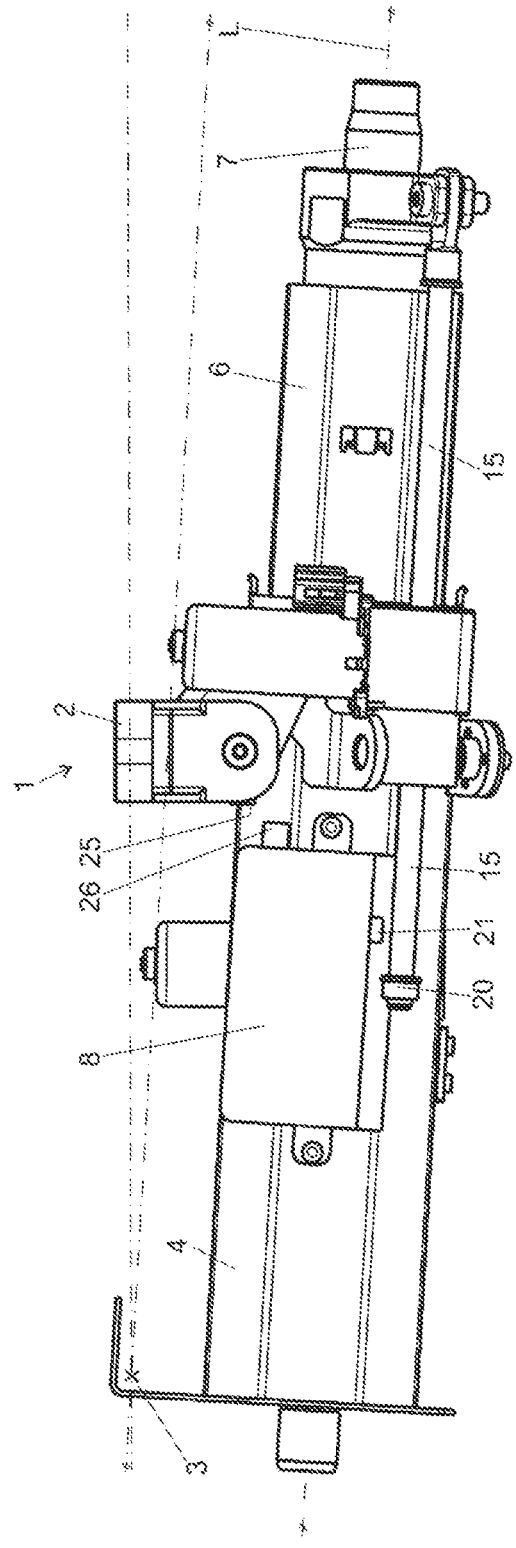
FIG. 6 is yet another side view of the steering column from FIG. 1.

FIG. 6 shows a side view of the steering column 1 from FIG. 1. The steering column 1 is in an adjustment position slightly retracted from the center position in the direction of the longitudinal adjustment.

With respect to the height adjustment, the steering column 1 is in a lower position. That is to say, the steering column 1 is in a lower adjustment position in its height adjustment direction.

Figure 7:
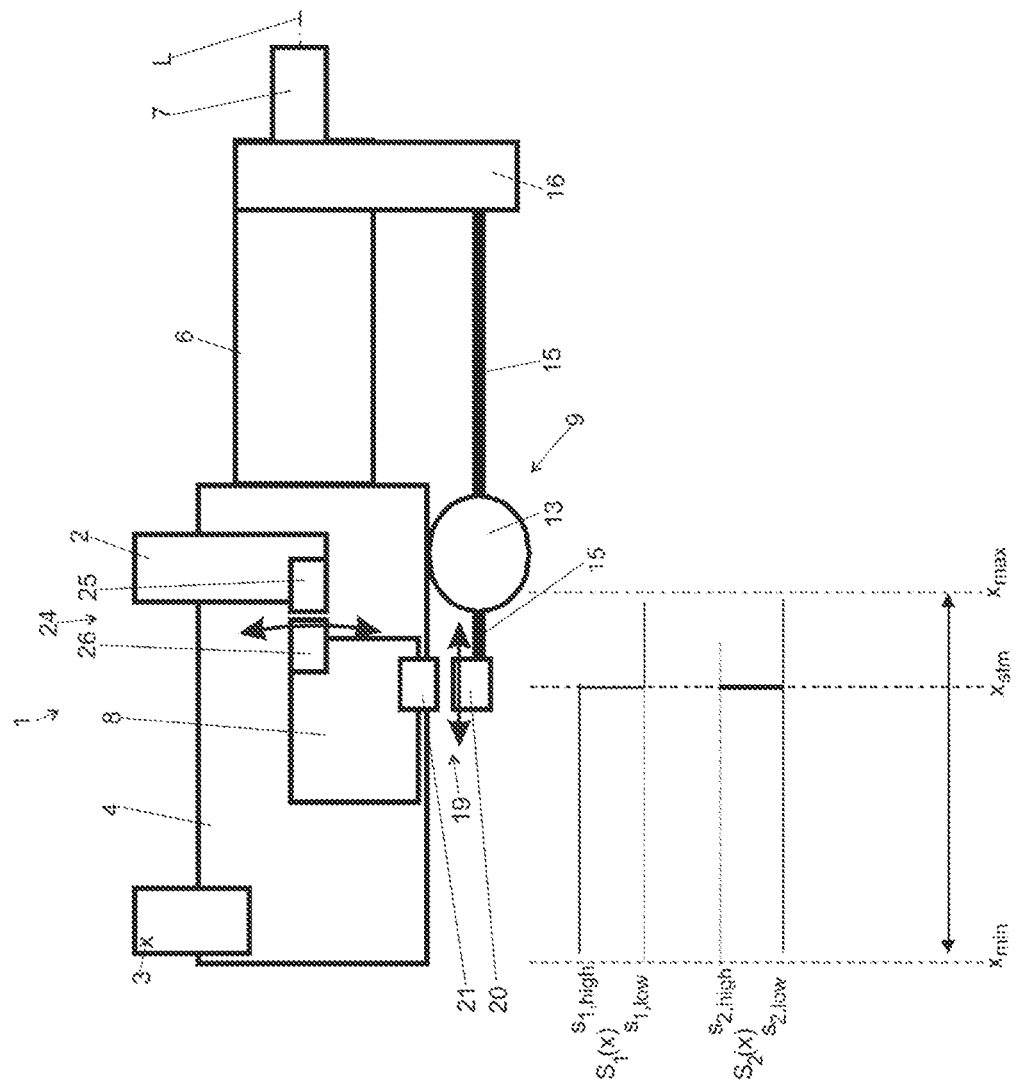
FIG. 7 is a highly simplified schematic side view of the steering column from FIG. 1 with a graph of possible signals.

FIG. 7, at the top, shows a highly simplified, schematic side view of the steering column 1 from FIG. 1. As stated above, the steering column 1 comprises the supporting unit 2, the casing unit 4 fastened to the supporting unit 2 so as to be pivotable about the pivot axis 3, the control unit 8, and the adjustment device 9. The actuating unit 6 which can be telescoped along the steering spindle axis L is mounted in the casing unit 3. The steering spindle 7 is rotatably mounted in the actuating unit 6.

The steering column 1 is in its center position in the longitudinal adjustment direction. The transmitter module 20 and the receiver module 21 of the second sensor unit 19 of the position-sensing device 11 assigned to the adjustment device 9 are arranged with respect to one another in such a manner that they are directly opposite one another in the center position, with the result that the distance between the transmitter module 20 and the receiver module 21 falls below a stipulated threshold value. The receiver module 21 is permanently connected to the control unit 8 and is therefore stationary in the longitudinal adjustment direction. The transmitter module 20 is arranged at that end of the threaded spindle 15, displaceable along its longitudinal axis, which faces away from the driver. Therefore—as indicated by the horizontal double-pointed arrow running parallel to the steering spindle axis—the transmitter module 20 can be displaced relative to the fixed receiver module 21.

The steering column 1 is also in its center position in the height adjustment direction. The transmitter module 25 and the receiver module 26 of the second sensor unit 24 of the position-sensing device 12 assigned to the adjustment device 10 are arranged with respect to another in such a manner that they are directly opposite one another in the center position, with the result that the distance between the two modules 25, 26 falls below a stipulated threshold value. The transmitter module 25 is permanently connected to the supporting unit 2 and is therefore stationary in the height adjustment direction.

The receiver module 26 is fastened to the control unit 8. The control unit 8 is in turn permanently connected to the pivotable casing unit 4. Therefore—as indicated by the vertically bent, double-pointed arrow running virtually perpendicular to the steering spindle axis—the receiver module 26 can be pivoted relative to the fixed transmitter module 25.

FIG. 7, at the bottom, shows a graph having two possible embodiments of a signal, specifically a revision signal or state signal. The signal $S_1(x)$ represents a signal value $s_1$ over the travel or adjustment travel $x_{min} \leq x \leq x_{max}$ of the threaded spindle 15 and therefore of the steering spindle 7 in the longitudinal adjustment direction from the fully retracted longitudinal adjustment $x_{min}$ (minimum adjustment position of the steering spindle 7) to the fully extended longitudinal adjustment $x_{max}$ (maximum adjustment position of the steering spindle 7). The signal value $s_1$ represents different states which can be assumed by the steering column 1 during adjustment. In this embodiment, the signal value $s_1$ assumes two different values, specifically $s_{1,low}$ and $s_{1,high}$, where $s_{1,low} < s_{1,high}$. In contrast, the signal value $s_1$ can generally assume further values. The longitudinal adjustment $x_{stm}$ denotes the relative positioning of the transmitter module 20 with respect to the receiver module 21 precisely when the relative distance between the transmitter module 20 and the receiver module 21 falls below the previously stipulated threshold value during adjustment and a stimulus is consequently generated in the signal. The stimulus, that is to say the information, indicating that the distance between the transmitter module 20 and the receiver module 21 has fallen below the previously stipulated threshold value during adjustment is modulated as a step in the signal. The signal $S_1(x)$ is therefore a changeover or step signal.

In a similar manner, the signal $S_2(x)$ represents an alternative signal value $s_2$ over the adjustment travel $x_{min} \leq x \leq x_{max}$ in the longitudinal adjustment direction. In contrast to the above-mentioned signal, the signal $S_2(x)$ is a pulse signal. Therefore, the stimulus, that is to say the information, indicating that the distance between the transmitter module 20 and the receiver module 21 has fallen below the previously stipulated threshold value during adjustment is modulated as a pulse in the signal.

For the sake of better clarity, the graph (FIG. 7, at the bottom) is laterally oriented with respect to the schematic side view (FIG. 7, at the top) in such a manner that the adjustment positions $x_{min}$, $x_{stm}$ and $x_{max}$ are each correctly placed below the corresponding positions of the transmitter module 20.

The stimulus, and therefore the distinction of states of the steering column 1, makes it possible to control different subsystems of the motor vehicle depending on the respective state.

Figure 8:
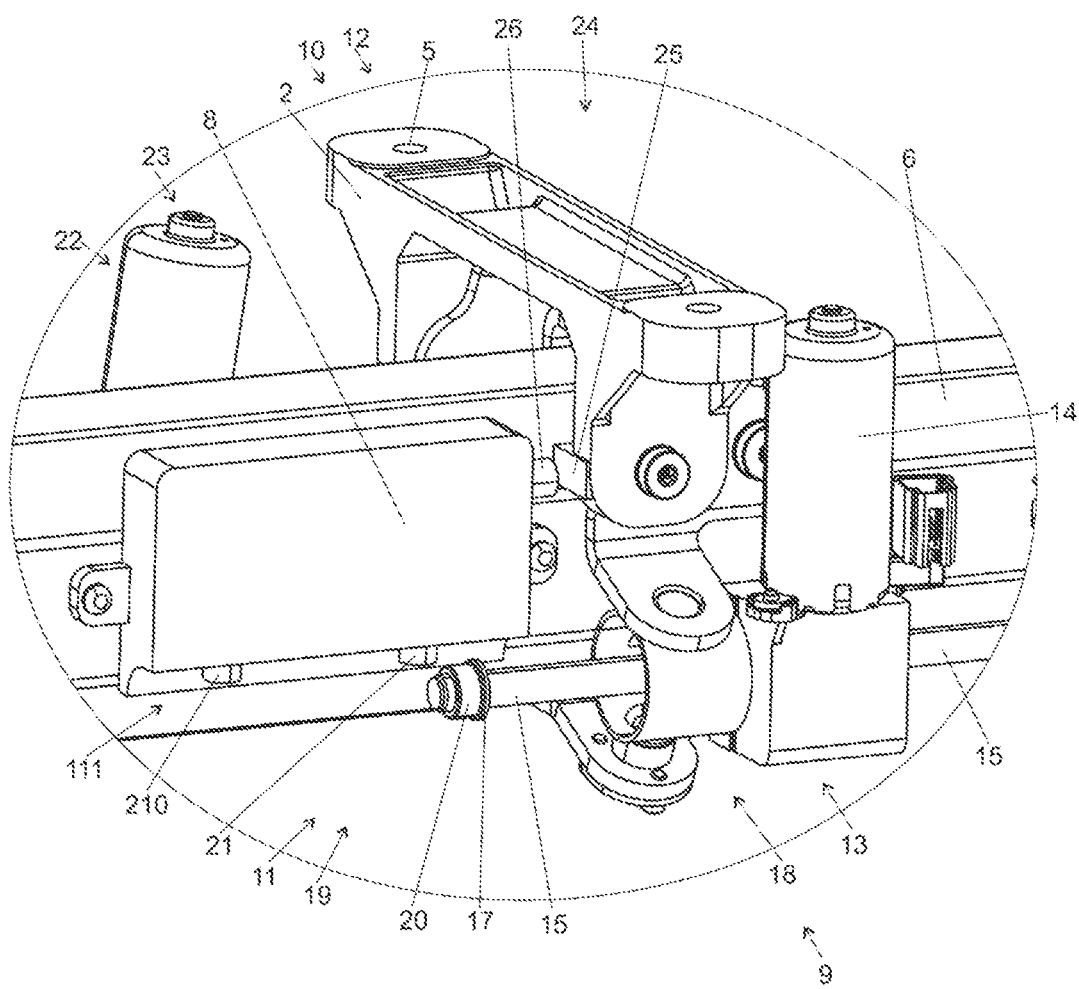
FIG. 8 is a perspective view of another embodiment of a steering column.

FIG. 8 shows a steering column 1 in an alternative embodiment, wherein, in contrast to the steering column of the first embodiment in FIGS. 1 to 7, this steering column has a position-sensing device 11 with an additional, third sensor unit 111.

The first sensor unit 18 is integrated in the adjustment drive 13. The translational movement of the threaded spindle 15 along its longitudinal axis corresponds, on account of the kinematic connection achieved via the articulation lever 16, to the translational movement of the steering spindle 7 along the steering spindle axis L. The first sensor unit 18 senses the longitudinal adjustment of the steering spindle 7 by means of a relative or incremental measurement method. This means that the first sensor unit 18 senses the change in a measurement variable, specifically the change in length or the change in the longitudinal adjustment of the steering spindle 7. The sensed change in the measurement variable is then related to a known reference value in order to determine the sensor value. The sensor value from the first sensor unit 18 corresponds to this reference value, while accordingly taking into account the sensed change in the measurement variable. The first sensor unit 18 senses the longitudinal adjustment of the steering spindle 7 continuously, that is to say during the entire operating time of the steering column or at least during the entire adjustment period.

The second sensor unit 19 senses the longitudinal adjustment of the steering spindle 7 by means of an absolute measurement method. That is to say that the second sensor unit 19 senses a measurement variable as such, specifically the first predetermined position or the length or the longitudinal adjustment of the steering spindle 7. A reference to a reference value is not required and does not take place. Rather, the sensor value from the second sensor unit 19 corresponds directly to the sensed measurement variable.

The third sensor unit 111 senses the longitudinal adjustment of the steering spindle 7 by means of an absolute measurement method. That is to say that the third sensor unit 19 senses a measurement variable as such, specifically the second predetermined position or the length or the longitudinal adjustment of the steering spindle 7. In this case, the second predetermined position is at a distance from the first predetermined position. The third sensor unit 111 comprises a receiver module 210 and a transmitter module which can also be referred to as a transducer module and is identical to the transmitter module 20 of the second sensor unit 19. The third sensor unit 111 is identical to the second sensor unit 19 in terms of structure and mode of operation, except for the position in which it is arranged.

LIST OF REFERENCE SIGNS

1 Steering column
2 Supporting unit
3 Pivot axis
4 Casing unit
5 Through-openings
6 Actuating unit
7 Steering spindle
8 Control unit
9 Adjustment device 10 Adjustment device
11 Position-sensing device
12 Position-sensing device
13 Adjustment drive
14 Electric motor
15 Threaded spindle
16 Articulation lever
17 End stop
18 First sensor unit
19 Second sensor unit
20 Transmitter module
21 Receiver module
22 Adjustment drive
23 First sensor unit
24 Second sensor unit
25 Transmitter module
26 Receiver module
111 Third sensor unit
210 Receiver module
L Steering spindle axis

What is claimed is:

1. A steering column for a motor vehicle, comprising:
an actuating unit in which a steering spindle is rotatably mounted, the actuating unit being held in an adjustable manner by a supporting unit;
an adjustment device configured to adjust the actuating unit with respect to the supporting unit; and
a position-sensing device that comprises:
a first sensor unit configured to sense a position of the actuating unit with respect to the supporting unit, and
a second sensor unit configured to sense a state where the actuating unit is in a predetermined position relative to the supporting unit, wherein at least one of the first sensor unit or the second sensor unit is configured to operate in a contactless manner.

2. The steering column of claim 1 wherein the first sensor unit is configured to operate in a contactless manner.

3. The steering column of claim 1 wherein the second sensor unit is configured to operate in a contactless manner.

4. A steering column for a motor vehicle, comprising:
an actuating unit in which a steering spindle is rotatably mounted, the actuating unit being held in an adjustable manner by a supporting unit;
an adjustment device configured to adjust the actuating unit with respect to the supporting unit; and
a position-sensing device that comprises:
a first sensor unit configured to sense a position of the actuating unit with respect to the supporting unit, and
a second sensor unit configured to sense a state where the actuating unit is in a predetermined position relative to the supporting unit, wherein the sensor units are configured to use the same measurement principles or wherein the sensor units are configured to use different measurement principles.

5. The steering column of claim 1 wherein the position-sensing device comprises a third sensor unit configured to sense a second state where the actuating unit is in a predetermined second position relative to the supporting unit.

6. The steering column of claim 1 wherein the actuating unit is adjustable relative to the supporting unit in a longitudinal adjustment direction and/or in a height adjustment direction.

7. A method for adjusting a steering column for a motor vehicle, comprising:
an actuating unit in which a steering spindle is rotatably mounted, the actuating unit being held in an adjustable manner by a supporting unit;
an adjustment device configured to adjust the actuating unit with respect to the supporting unit; and
a position-sensing device that comprises:
a first sensor unit configured to sense a position of the actuating unit with respect to the supporting unit, and
a second sensor unit configured to sense a state where the actuating unit is in a predetermined position relative to the supporting unit, the method comprising:
adjusting the actuating unit relative to the supporting unit with the adjustment device;
sensing a position of the actuating unit with the first sensor unit;
sensing a state with the second sensor unit where the actuating unit is in a predetermined position relative to the supporting unit;
comparing the position sensed by the first sensor unit with the predetermined position of the actuating unit when the second sensor unit senses the state; and
detecting a malfunction of one of the sensor units when a discrepancy determined by the comparison exceeds a stipulated threshold value.

8. The method of claim 7 comprising correcting the position of the first sensor unit upon detection of the malfunction.

9. The method of claim 7 comprising:
sensing a second state with a third sensor unit when the actuating unit is in a predetermined second position relative to the supporting unit;
comparing the position sensed by the first sensor unit with the predetermined second position of the actuating unit when the third sensor unit senses the second state; and
detecting a malfunction of one of the sensor units when a discrepancy determined by the comparison exceeds a stipulated threshold value.

10. The method of claim 9 comprising correcting the position of the first sensor unit upon detection of the malfunction.

11. The steering column of claim 9 comprising slowing down the adjusting of the actuating unit relative to the supporting unit.

12. The steering column of claim 9 comprising stopping the adjusting of the actuating unit relative to the supporting unit.

13. A method for controlling a subsystem of a motor vehicle having a steering column for a motor vehicle, comprising:
an actuating unit in which a steering spindle is rotatably mounted, the actuating unit being held in an adjustable manner by a supporting unit;
an adjustment device configured to adjust the actuating unit with respect to the supporting unit; and
a position-sensing device that comprises:
a first sensor unit configured to sense a position of the actuating unit with respect to the supporting unit, and
a second sensor unit configured to sense a state where the actuating unit is in a predetermined position relative to the supporting unit, the method comprising:
adjusting the actuating unit relative to the supporting with the adjustment device;
generating a state signal of the steering column based on a position of the actuating unit during adjustment, wherein the state signal is a changeover, step, or pulse signal;

either
- detecting a first state of the steering column when the state signal assumes or falls below or exceeds a first value, or detecting a second state of the steering column when the state signal assumes or falls below or exceeds a second value, or
- detecting a first state of the steering column before the state signal has a pulse, or detecting a second state after the state signal has a pulse; and controlling the subsystem, which corresponds to the detected state according to a stipulation.

* * * * *